(12) United States Patent
Marr (10) Patent No.: US 10,965,023 B2
(45) Date of Patent: Mar. 30, 2021

(54) PROGRAMMABLE BEAMFORMING SYSTEM INCLUDING ELEMENT-LEVEL ANALOG CHANNELIZER

(71) Applicant: Raytheon Company, Waltham, MA (US)

(72) Inventor: Harry B. Marr, Manhattan Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 210 days.

(21) Appl. No.: 15/861,398

(22) Filed: Jan. 3, 2018

(65) Prior Publication Data

US 2018/0145406 A1    May 24, 2018

Related U.S. Application Data

(62) Division of application No. 14/489,715, filed on Sep. 18, 2014, now Pat. No. 10,027,026.

(51) Int. Cl.
| | | |
|---|---|---|
| *H01Q 3/00* | (2006.01) | |
| *H04B 7/06* | (2006.01) | |
| *H01Q 3/26* | (2006.01) | |
| *H01Q 21/10* | (2006.01) | |

(52) U.S. Cl.
CPC ............ *H01Q 3/00* (2013.01); *H04B 7/0617* (2013.01); *H01Q 3/26* (2013.01); *H01Q 21/10* (2013.01); *H04B 7/0634* (2013.01)

(58) Field of Classification Search
CPC . H01Q 3/00; H01Q 21/00; H01Q 3/26; H04B 7/0617; H04B 7/0634

USPC .................................................. 342/368, 372
See application file for complete search history.

(56) References Cited

U.S. PATENT DOCUMENTS

| | | |
|---|---|---|
| 2,989,744 A | 6/1961 | Pettit |
| 3,170,158 A | 2/1965 | Rotman |
| 3,720,952 A | 3/1973 | Lawsine |
| 3,992,099 A | 11/1976 | Laughlin |

(Continued)

FOREIGN PATENT DOCUMENTS

| | | |
|---|---|---|
| CA | 1229926 A1 | 12/1987 |
| CN | 101241535 A | 8/2008 |

(Continued)

OTHER PUBLICATIONS

Grollitsch et al., "A 1.4 psrms-Period-Jitter TDC-less Fractional-N Digital PLL with Digitally Controlled Ring Oscillator in 65nm CMOS" Solid-State Circuits Conference Digest of Technical Papers (ISSCC), 2010 IEEE International. IEEE, 2010, pp. 478-480.

(Continued)

*Primary Examiner* — Chuong P Nguyen
(74) *Attorney, Agent, or Firm* — Cantor Colburn LLP (57) ABSTRACT

A beamforming system includes a plurality of channelizers and a channel switching module in signal communication with the channelizers. Each channelizer is configured to receive a respective input radio frequency signal and to generate a plurality of respective channels in response to downsampling the respective input radio frequency signal. The channel switching module includes a channel combining circuit configured to selectively combine a common channel generated by each channelizer to form at least one steered analog beam.

7 Claims, 7 Drawing Sheets

(56) References Cited

U.S. PATENT DOCUMENTS

| | | | |
|---|---|---|---|
| 4,328,496 | A | 5/1982 | White |
| 4,613,863 | A | 9/1986 | Mitchell |
| 5,032,839 | A | 7/1991 | Even-Or |
| 5,563,819 | A | 10/1996 | Nelson |
| 5,717,620 | A | 2/1998 | Williams |
| 6,002,722 | A | 12/1999 | Wu |
| 6,052,085 | A * | 4/2000 | Hanson .............. H01Q 3/26 |
| | | | 342/373 |
| 6,091,704 | A | 7/2000 | Butash |
| 6,104,346 | A | 8/2000 | Rudish |
| 6,181,740 | B1 * | 1/2001 | Yasuda ............. H03D 3/006 |
| | | | 375/232 |
| 6,222,409 | B1 | 4/2001 | Kieda |
| 6,285,197 | B2 | 9/2001 | Walker et al. |
| 6,397,050 | B1 | 5/2002 | Peterson et al. |
| 6,760,342 | B1 | 7/2004 | Skones et al. |
| 6,898,235 | B1 * | 5/2005 | Carlin ............... H04B 1/001 |
| | | | 342/147 |
| 6,954,614 | B2 | 10/2005 | Jespersen |
| 7,047,043 | B2 | 5/2006 | Reilly et al. |
| 7,069,052 | B2 | 6/2006 | Ylitalo |
| 7,324,036 | B2 | 1/2008 | Petre et al. |
| 7,737,892 | B2 * | 6/2010 | Richardson ....... G01S 13/5244 |
| | | | 342/375 |
| 7,801,228 | B2 | 9/2010 | Lehne et al. |
| 7,830,982 | B2 * | 11/2010 | Mesecher ........... H01Q 1/282 |
| | | | 375/299 |
| 7,973,713 | B2 | 7/2011 | Gallagher et al. |
| 8,045,654 | B1 | 10/2011 | Anderson |
| 8,174,325 | B1 | 5/2012 | Leung |
| 8,175,199 | B2 | 5/2012 | Nakatani |
| 8,418,210 | B2 | 4/2013 | Knutson et al. |
| 8,578,256 | B2 | 11/2013 | Graef |
| 9,118,513 | B2 | 8/2015 | Velazquez et al. |
| 9,209,957 | B2 * | 12/2015 | Yu ..................... H04L 5/06 |
| 9,274,542 | B2 * | 3/2016 | Marr .................. G06F 1/0321 |
| 9,287,983 | B2 | 3/2016 | Plankl |
| 9,313,300 | B2 * | 4/2016 | Akhter ............... H04L 69/04 |
| 9,344,262 | B2 * | 5/2016 | Yu ..................... H04B 7/18513 |
| 9,385,831 | B2 * | 7/2016 | Marr .................. H04K 3/42 |
| 9,484,971 | B2 | 11/2016 | Corbalis |
| 9,831,933 | B1 | 11/2017 | Chieh et al. |
| 10,084,587 | B1 | 9/2018 | Thompson |
| 10,135,955 | B2 * | 11/2018 | Akhter ............... H04L 69/08 |
| 10,177,947 | B2 * | 1/2019 | Agee .................. H04L 25/08 |
| 10,348,338 | B2 * | 7/2019 | Marr .................. H04L 5/06 |
| 10,536,302 | B1 * | 1/2020 | Marr .................. H04L 25/0212 |
| 2001/0011893 | A1 | 8/2001 | Walker et al. |
| 2001/0022811 | A1 | 9/2001 | Lillington |
| 2002/0010870 | A1 | 1/2002 | Gardner |
| 2003/0016770 | A1 | 1/2003 | Trans et al. |
| 2003/0076899 | A1 | 4/2003 | Kumar et al. |
| 2003/0112904 | A1 | 6/2003 | Fuller et al. |
| 2003/0133524 | A1 | 7/2003 | Miller et al. |
| 2004/0189384 | A1 | 9/2004 | Kemna et al. |
| 2005/0094722 | A1 | 5/2005 | Takatori et al. |
| 2005/0156775 | A1 | 7/2005 | Petre |
| 2007/0223607 | A1 | 9/2007 | Lehne et al. |
| 2007/0223754 | A1 | 9/2007 | Roeck |
| 2007/0285312 | A1 | 12/2007 | Gao et al. |
| 2009/0163161 | A1 | 6/2009 | Robinson et al. |
| 2009/0239551 | A1 | 9/2009 | Woodsum |
| 2010/0271107 | A1 | 10/2010 | Tran et al. |
| 2010/0315292 | A1 | 12/2010 | Ciu et al. |
| 2011/0103430 | A1 | 5/2011 | Witrisal |
| 2011/0260911 | A1 | 10/2011 | Sapp |
| 2011/0274222 | A1 | 11/2011 | Hinson |
| 2012/0189084 | A1 | 7/2012 | Yu |
| 2012/0235646 | A1 | 9/2012 | Lo et al. |
| 2014/0105416 | A1 | 4/2014 | Huttunen et al. |
| 2014/0133603 | A1 | 5/2014 | Velazquez |
| 2014/0210666 | A1 | 7/2014 | Maltsev et al. |
| 2014/0241463 | A1 | 8/2014 | Leenaerts et al. |
| 2014/0286444 | A1 | 9/2014 | Au et al. |
| 2015/0156284 | A1 * | 6/2015 | Akhter ............... H04L 69/04 |
| | | | 370/477 |
| 2015/0234030 | A1 | 8/2015 | Marr |
| 2015/0365185 | A1 | 12/2015 | Thompson et al. |
| 2018/0102926 | A1 | 4/2018 | Marr et al. |
| 2018/0248575 | A1 | 8/2018 | Bardin et al. |
| 2019/0036675 | A1 * | 1/2019 | Thompson ......... G01S 3/808 |
| 2019/0140872 | A1 * | 5/2019 | Agee .................. H04W 52/52 |

FOREIGN PATENT DOCUMENTS

| | | |
|---|---|---|
| EP | 0344794 A2 | 12/1989 |
| EP | 1596220 B1 | 11/2005 |
| EP | 2425635 A1 | 8/2013 |
| EP | 2728770 A2 | 5/2014 |
| EP | 2779473 A2 | 9/2014 |
| FR | 2689249 A1 | 10/1993 |
| GB | 2308034 A | 6/1997 |
| JP | H05237865 A | 9/1993 |
| JP | H05298827 A | 11/1993 |
| JP | H10221429 A | 8/1998 |
| JP | 2001208831 A | 8/2001 |
| JP | 2002286831 A | 10/2002 |
| JP | 2008164479 A | 7/2008 |
| JP | 2010127645 A | 6/2010 |
| KR | 20080020078 a | 3/2008 |
| WO | 9306502 A1 | 4/1993 |
| WO | 99039517 A3 | 10/1999 |
| WO | 0011823 A1 | 3/2000 |
| WO | 0041340 A1 | 7/2000 |
| WO | 2005050241 A3 | 6/2005 |
| WO | 2012024507 A2 | 2/2012 |

OTHER PUBLICATIONS

International Search Report and Written Opinion; International Application No. PCT/US2015/016298; International Filing Date: Feb. 18, 2015; dated May 11, 2015; 12 pages.

Japanese Office Action for Patent Application No. 2016-568024; Application Filing Date May 29, 2015; dated Jun. 19, 2018; 4 pages.

Korean Office Action for Patent Application No. 10-2016-7035214; Application Filing Date May 29, 2015; dated Jan. 2, 2018; 13 pages.

Magalhaes et al. "RF and IF channelizers for wide-band sensing in cognitive/software-defined-radio receivers." Microwave Integrated Circuits Conference (EuMIC), 2012 7th European. IEEE, 2012, pp. 778-781.

Ozalevli et al., "VLSI Implementation of a Reconfigurable, Mixed-Signal Finite Impulse Response Filter" School of Electrical and Computer Engineering Georgia Institute of Technology, 2007, pp. 2168-2171.

PCT International Search Report and Written Opinion; International Application No. PCT/US2018/035048; International Filing Date: May 30, 2018; dated Oct. 9, 2018; 12 pages.

Sewter et al., "A CMOS finite impulse response filter with a crossover traveling wave topology for equalization up to 30 Gb/s" IEEE Journal of Solid-State Circuits, vol. 41, No. 4, Apr. 2006 (9 pages).

Swenson et al.; "Discrete-Time Channelizers for Aeronautical Telemetry: Part I—Fixed Bandwidth"; Oct. 22, 2012; https://users.ece.cmu.edu/~brianswe/pdfs/channelizer.pdf [retrieved on Sep. 19, 2018] (14 pages).

Swenson et al.; "Discrete-Time Channelizers for Aeronautical Telemetry: Part II—Fixed Bandwidth"; Oct. 22, 2012; https://users.ece.cmu.edu/~brianswe/pdfs/channelizer2.pdf [retrieved on Sep. 19, 2018] (13 pages).

Tasca et al., "A 2.9-to-4.0 GHz Fractional-N Digital PLL with Bang-Bang Phase Detector and 560fs rms Integrated Jitter at 4.5 mW Power." IEEE Journal of Solid-State Circuits, vol. 46, No. 12, Dec. 2011, pp. 2745-2758.

Ahnstrom et al., "Detection and direction-finding of spread spectrum signals using correlation and narrowband interference rejection", Proc. Nordic Matlab Conference, Copenhagen, Denmark, 2003, 5 pages.

(56) References Cited

OTHER PUBLICATIONS

Akpa et al., "N-parallel filter bank equivalent to tree structure", Electrical and Computer Engineering Conference Proceedings, 1994, pp. 494-496.

Balakrishnan et al., "Implementation of radix-2 and split-radix fast fourier transform algorithm using current mirrors", 2013 International Conference on Circuits, Power and Computing Technologies (ICCPCT), IEEE, Mar. 20, 2013, pp. 730-735.

Chang et al., "Reconfigurable Architectures for Low Complexity Software Radio Channelizers using Hybrid Filter Banks," 10th IEEE Singapore International Conference on Communication systems, Oct. 2006, pp. 1-5.

Darak et al., "A reconfigurable filter bank for uniform and non-uniform channelization in multi-standard wireless communication receivers," IEEE 17th International Conference on Telecommunications (ICT), Apr. 4-7, 2010, pp. 951-956.

HOLLER et al. "A 2-20-GHz Analog Lag Correlator for Radio Interferometry", IEEE Transactions on Instrumentation and Measurement, vol. 61, No. 8, Aug. 2012, pp. 2253-2261.

Houghton et al., "Direction finding on spread-spectrum signals using the time-domain filtered cross spectral density", IEEE Proceedings of Radar, Sonar and Navigation, vol. 144, No. 6, Dec. 1997, pp. 315-320.

Zhang et al., "Reconfigurable beam forming using phase-aligned Rotman lens", www.ietdl.org, The Institute of Engineering and Technology, 2012, pp. 326-330.

International Search Report and Written Opinion; International Application No. PCT/US2015/033207; International Filing Date: May 29, 2015; dated Sep. 17, 2015; 11 pages.

International Search Report and Written Opinion; PCT Application No. PCT/US2015/025537; International Filing Date: Apr. 13, 2015; dated Jul. 28, 2015; 12 pages.

International Preliminary Report on Patentability; PCT Application No. PCT/US2015/016298; International Filing Date: Feb. 18, 2015; dated Sep. 1, 2016; 12 pages.

International Preliminary Report on Patentability; PCT Application No. PCT/US2015/039877; International Filing Date: Jul. 10, 2015; dated Mar. 30, 2017; 8 pages.

International Search Report and Written Opinion; International Application No. PCT/US2017/054862; International Filing Date: Oct. 3, 2017; dated Dec. 7, 2017; 12 pages.

Lambrecht et al., "True-Time-Delay Beamforming With a Rotman-Lens for Ultrawideband Antenna Systems", IEEE Transactions on Antennas and Propagation, vol. 58, No. 10, Oct. 2010, pp. 3189-3195.

Lehne et al., "A 0.13-um 1-GS/s CMOS Discrete-Time FFT Processor for Ultra-Wideband OFDM Wireless Receivers", IEEE Transactions on Microwave Theory and Techniques, vol. 59, No. 6, Jun. 2011, pp. 1639-1650.

Lillington, "Flexible channelisation architectures for Software Defined Radio front ends using a Tuneable Pipelined Frequency Transform", IET Seminar Digest, vol. 2003, No. 1, 2003, pp. 1-13.

Lillington, "The pipelined frequency transform (PFT)", RF Engines, Electronic Engineering, Jun. 17, 2002, pp. 1-5.

Mahesh et al., "Coefficient decimation approach for realizing reconfigurable finite impulse response filters," IEEE International Symposium on Circuits and Systems, ISCAS, May 18-21, 2008, pp. 81-84.

Mahesh et al., "Reconfigurable low area complexity filter bank architecture based on frequency response masking for nonuniform channelization in software radio receivers", IEEE Transactions on Aerospace and Electronic Systems, vol. 47, No. 2, Apr. 2011.

Navarro et al. "Non-uniform channelization methods for next generation SDR PMR base stations", 2011 IEEE Symposium on Computers and Communications, Jul. 2011, pp. 620-625.

JP Office Action; JP Patent Application No. 2016-568024; dated Oct. 31, 2017; 5 pages.

PCT International Search Report and Written Opinion; International Application No. PCT/US2015/039877; International Filing Date; Jul. 10, 2015; dated Oct. 6, 2015; 12 pages.

Sju, "Pipelined Frequency Transform PFT", RF Engines Limited Data Sheet, Apr. 29, 2002, pp. 1-25.

Smitha et al., "A new low power reconfigurable decimation interpolation and masking based filter architecture for channel adaptation in cognitive radio handsets," Physical Communication, Jan. 2, 2009, pp. 47-57.

Suh et al., "Low-Power Discrete Fourier Transform for OFDM: A Programmable Analog Approach", IEEE Transactions on Circuits and Systems I: Regular Papers, IEEE, vol. 58, No. 2, Feb. 1, 2011, pp. 290-298.

* cited by examiner

PROGRAMMABLE BEAMFORMING SYSTEM INCLUDING ELEMENT-LEVEL ANALOG CHANNELIZER

DOMESTIC PRIORITY

This application is a divisional of U.S. patent application Ser. No. 14/489,715, filed Sep. 18, 2014, the disclosure of which is incorporated by reference herein in its entirety.

STATEMENT OF GOVERNMENT INTEREST

This invention was made with Government support under Contract No.: HR0011-14-C-0002 awarded by the Department of Defense. The Government has certain rights in this invention.

BACKGROUND

The present disclosure relates to electronic signal processing, and more specifically, to directional signal transmission and/or reception.

Hardware implementations of wideband systems are inhibited with respect to the increased demand for bandwidth requirements. One technique used to address the increase in bandwidth requirements is to reduce a signal band into a plurality of sub-bands using a channelizer. Each of the sub-bands can then be processed on parallel channels. Conventional beamforming systems require digital channelizers to mix down the incoming radio frequency (RF) signal at the channelizer array level, which results in very low spurious content. Further, a digital channelizer typically requires a field-programmable gate array (FPGA), which inherently limits the system from sampling high frequency signals such as frequencies operating in the $K_u$ band.

SUMMARY

According to at least one embodiment, a beamforming system includes a plurality of channelizers and an electronic channel switching module in signal communication with the channelizers. Each channelizer is configured to receive a respective input radio frequency signal and to generate a plurality of respective channels in response to downsampling the respective input radio frequency signal. The channel switching module includes a channel combining circuit configured to selectively combine a common channel generated by each channelizer to form at least one steered analog beam.

According to another embodiment, a method of beamforming a radio frequency signal comprises downsampling an incoming radio frequency signal to generate a plurality of polyphase lanes. The method further comprises generating a plurality of channel sets based on the polyphase lanes. Each channel set includes a plurality of channels. The method further comprises selectively combining a common channel of each channel set to form at least one steered analog beam.

A beamforming system comprises an electronic inverse channelizer unit including a polyphase decimating finite impulse response (FIR) filter array configured to output a first plurality of up-sampled baseband channels. At least one electronic Fourier transform unit is configured to convert the first plurality of up-sampled baseband channels into a second plurality of real output signals. An electronic commutator unit is configured to generate a single radio frequency (RF) output signal in response to combining the second plurality of real output signals.

Additional features are realized through the techniques of the present invention. Other embodiments and aspects of the invention are described in detail herein and are considered a part of the claimed invention. For a better understanding of the invention with the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection. It should be understood that throughout the drawings, corresponding reference numerals indicate like or corresponding parts and features. As used herein, the term module, unit and/or element can be formed as processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
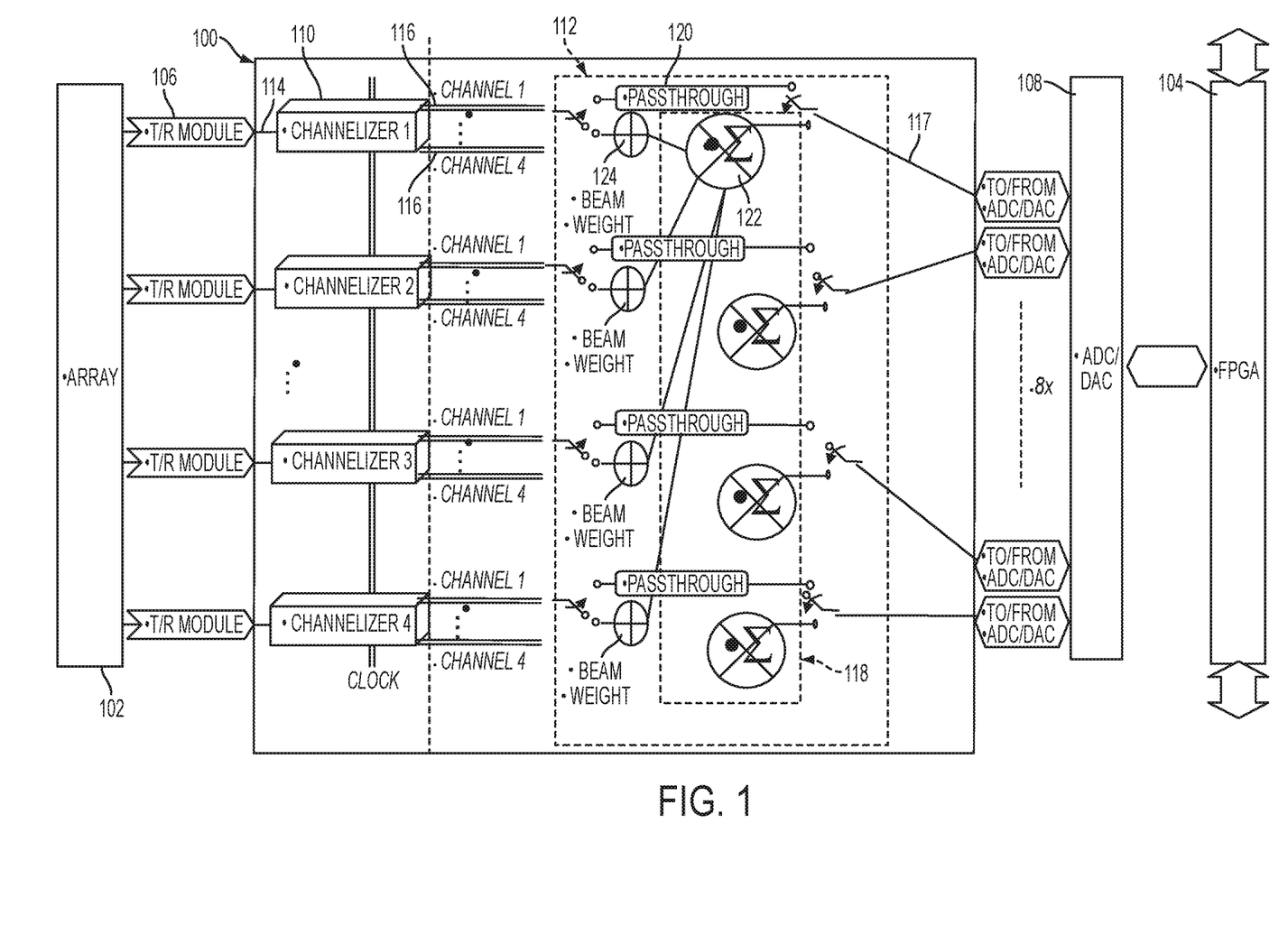
FIG. 1 is a schematic diagram of a beamforming system according to an exemplary embodiment.

With reference now to FIG. 1, a beamforming system 100 is illustrated according to a non-limiting embodiment. According to an embodiment, the beamforming system 100 is interposed between an element array 102 and an electronic processing module 104 such as, for example, a field programmable gate array (FPGA) 104. Although a FPGA 104 is described going forward, it is appreciated that any programmable device may be used. The element array 102 may include a single antenna, or a plurality of individual antennas. One or more transceiver/receiver filter modules 106 are interposed between the element array 102 and the beamforming system 100 to filter an incoming radio frequency (RF) signal. The transceiver/receiver filter modules 106 can also include circulator elements, low noise amplifiers, and/or power amplifiers as understood by one of ordinary skill in the art. According to a non-limiting embodiment, the incoming RF signal has a frequency ranging from approximately 2 gigahertz (GHz) to approximately 12 GHz. One or more signal converter units 108 such as, for example, analog-to-digital converters (ADCs), are interposed between the beamforming system 100 and the FPGA 104 to convert a steered analog beam into a digital signal. Although an application for signal reception is described going forward, it is appreciated that the beamforming system 100 can also be utilized for transmission applications. In transmission applications, it is appreciated that the signal converter units 108 are digital-to-analog converters (DACs).

The beamforming system 100 includes a plurality of electronic channelizers 110 and an electronic channel switching module 112. Each channelizer 110 is configured to receive a respective RF signal 114 relayed by the element array 102 and generate a plurality of respective channels 116 in response to downsampling the respective RF signal 114. It is appreciated that an electronic commutator unit (not shown) can be disposed upstream from the channelizers 110 at the first stage. According to a non-limiting embodiment, each channelizer 110 generates four channels configured to deliver a downsampled signal having a frequency ranging from approximately 0 GHz to approximately 3.25 GHz.

The channel switching module 112 is in signal communication with the plurality of channelizers 110 and is disposed upstream from the signal converter units 108. The channel switching module 112 includes a channel combining circuit 118 and one or more pass-through circuits 120. The channel combining circuit 118 includes a plurality of summer units 122 configured to selectively combine a common channel 116 such as, for example channel 1, generated by each channelizer 110 to form at least one steered analog beam. The steered analog beam is then delivered to an output 117 and is received by a respective signal converter 108.

According to an embodiment, one or more beam weight units 124 are interposed between a respective channel 116 and the channel combining circuit 118. The beam weight units 124 apply a beam weight such as, for example a phase-shift, to the respective channel 116. The combination of respective beam weights adjusts a direction of a respective steered analog beam delivered to the output 117. One or more beams can also be steered by applying a true time delay within the channelizer. A combination of true time delay and beam weights such as, for example, phase shifts implemented as complex multiplies, can also steer one or more of the beams. In this manner, the channel switching module 112 can dynamically reconfigure at least one of a bandwidth of a respective beam and a number of total beams output from the channel combining circuit 118.

The pass-through circuits 120 are interposed between a respective channel 116 and a respective output 117. The pass-through circuit 120 forms a pass-through channel that selectively bypasses the channel combining circuit 112. The pass-through channel can be established either manually and/or automatically. In this manner, a low frequency output (e.g., an output having a frequency ranging, for example, from 0 GHz to approximately 3.25 GHz) of one or more of the channelizers 110 can be connected to the pass-through circuit 120 and delivered directly to the FPGA 104 where it is digitized. The pass-through circuit 120, however, is not limited to only low frequencies, and can be utilized any time it is desirable to combine one or more beams after digitization via the FPGA 104. According to a non-limiting embodiment, for example, the frequency of one or more channels 116 is compared to a frequency threshold. When the frequency of a channel 116 is below the frequency threshold, a low frequency channel is determined and the pass-through circuit 120 establishes the pass-through channel. In this manner, the low frequency channel bypasses the channel combining circuit 112 and is automatically delivered to the FPGA 104 for processing.

As mentioned above, it is appreciated that the beamforming system 100 can also be utilized for transmission applications. In transmission applications, it is appreciated that the signal converter units 108 are digital-to-analog converters (DACs).

Figure 2:
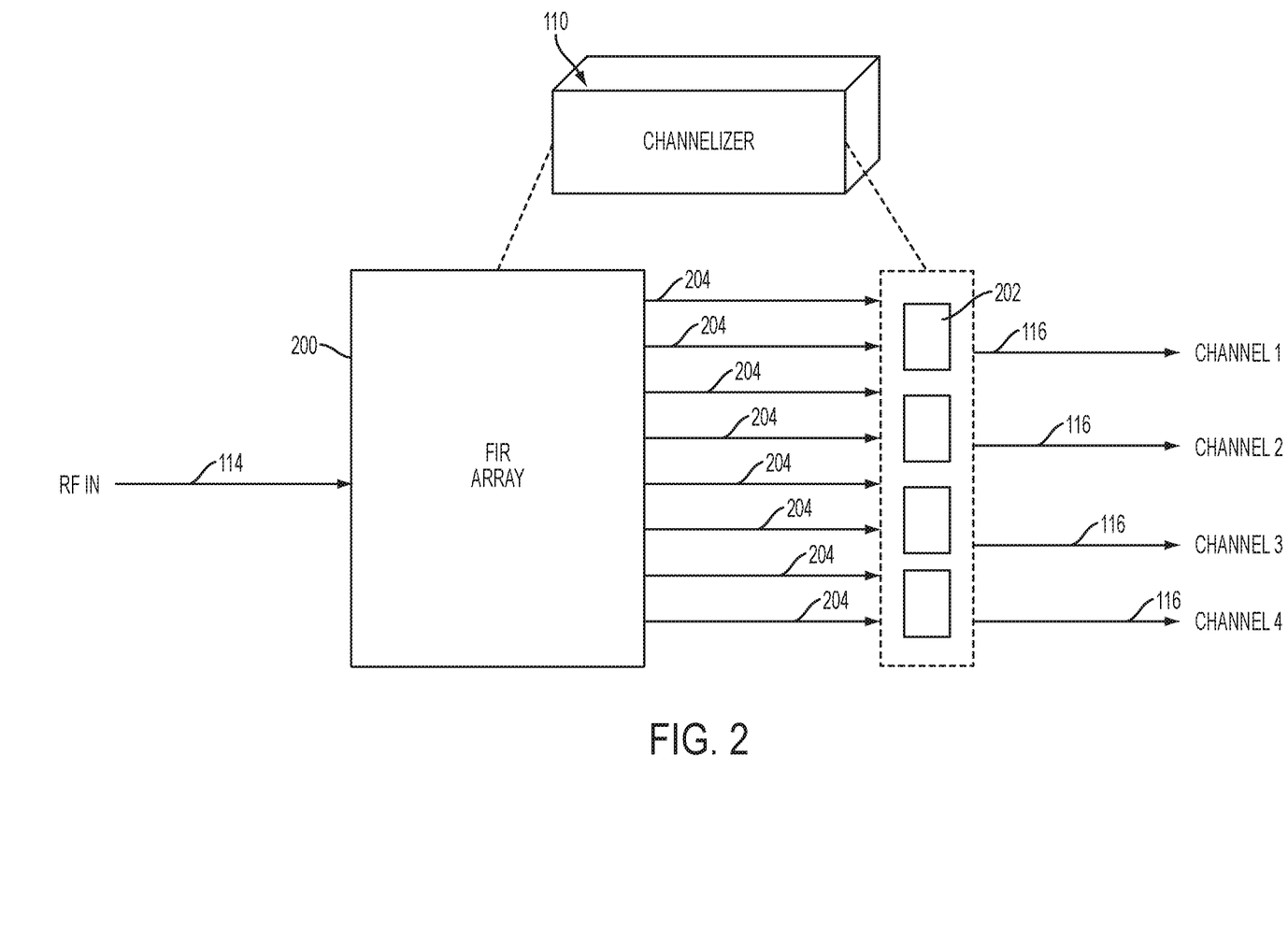
FIG. 2 is a schematic diagram of a channelizer included in a beamforming system according to an exemplary embodiment.

Turning to FIG. 2, a channelizer 110 included in the beamforming system 100 is illustrated according to a non-limiting embodiment. The channelizer 110 includes a filter unit 200 and one or more Fourier transfer units 202. The filter unit 200 includes, for example, a polyphase decimating finite impulse response (FIR) filter array which is configured to downsample an input RF signal 114 into a plurality of polyphase lanes 204 for shaping the filter response. Although the filter unit 200 is shown as outputting eight polyphase lanes 204, more or less polyphase lanes 204 may be output based on the desired application. The filter unit 200 is also configured to program a true time delay into one or more of the channels 116 generated by the channelizer 110. According to an embodiment, a number of taps corresponding to the FIR filter 200 in one or more of the channelizers 110 is dynamically reconfigurable. For example, the taps of the FIR filter 200 can be dynamically reconfigured to provide 48 filter taps, 64 filter taps, or 128 filter taps per channelizer 110.

The Fourier transform unit 202 executes a Fourier transform algorithm that aligns the output frequency domain signals to determine the portion of the frequency spectrum that is represented at baseband. In this manner, the output of the filter unit 200 is brought to baseband to generate the respective channels 116 output by the channelizer 110. The Fourier transform unit 202 can apply various Fourier transform algorithms to the signals received from a respective filter unit including, but not limited to, a discrete Fourier transform (DFT) algorithm and a fast Fourier transform (FFT) algorithm. The multiplier weights of the Fourier transform can be set such that the nyquist zone of choice is coherently combined and other nyquist zones are non-coherently combined. In this manner, a selected nyquist zone of choice is represented at base band. According to an exemplary embodiment, the channelizer 110 can be programed to allocate a spectrum across a frequency band of a respective channel 116. The frequency band can range, for example, from approximately 2 GHz to approximately 12 GHz. Although the channelizer 110 illustrated in FIG. 2 is shown as comprising four Fourier transform units 202, it is appreciated that the channelizer 110 may include more or less Fourier transfer units 202 to generate a particular number of channels 116 for a desired application.

Figure 3A:
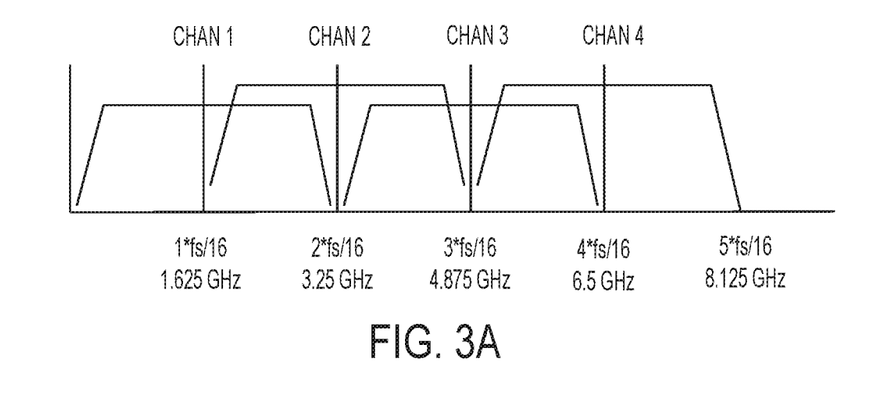
FIGS. 3A-3B are signal diagrams illustrating exemplary frequency responses of a channelizer illustrated in FIG. 2 according to an embodiment.
Figure 3B:
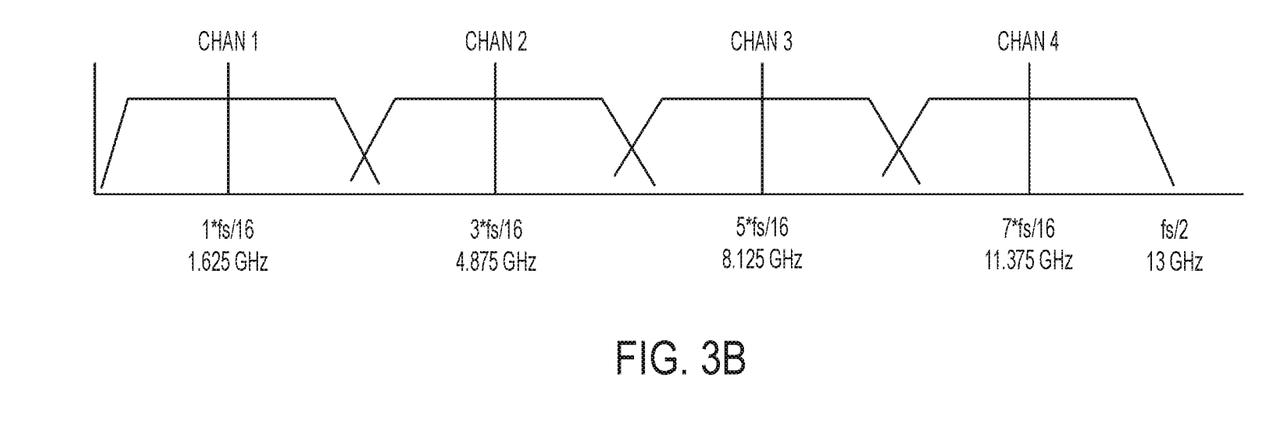

Referring to FIGS. 3A-3B, signal diagrams illustrating dynamic adjustment of a polyphase filter response provided by a channelizer 110 included in the beamforming system 100 is illustrated according to a non-limiting embodiment. According to an embodiment, a polyphase filter Fourier transform algorithm can be used to generate a response equivalent to a down-mixed bandpass filter response. As shown in FIG. 3A, for example, an overlapping narrow response is illustrated when the Fourier transfer units 202 are controlled to select a plurality of closely-adjacent channels such as, for example, the first four channels among eight total channels. In FIG. 3B, however, a non-overlapping wide filter response is illustrated when the Fourier transfer unit 202 is controlled to select a plurality of alternating channels such as, for example, every other channel among the eight total channels generated by the channelizer 110.

Figure 4:
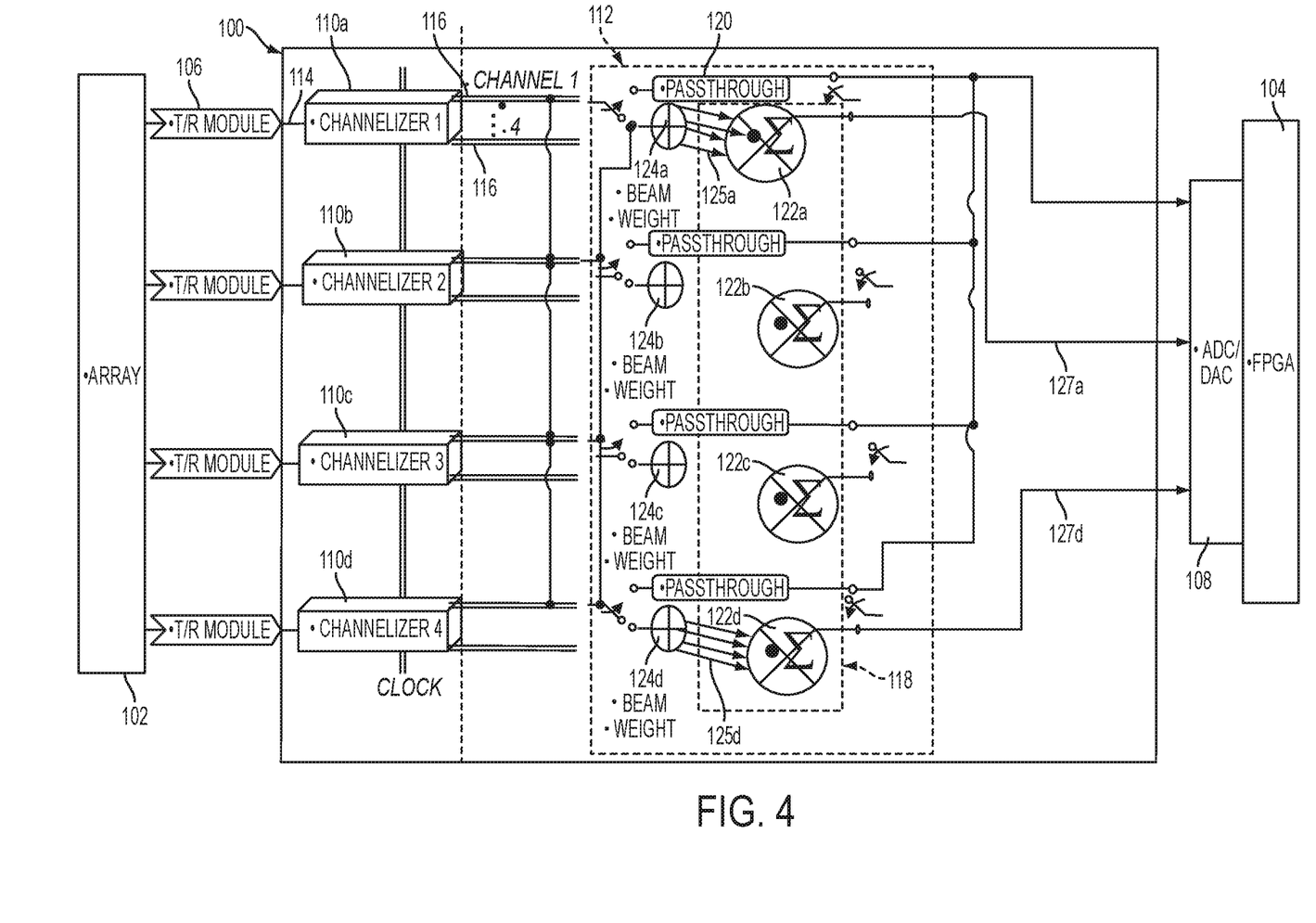
FIG. 4 is a schematic diagram of a beamforming system according to another exemplary embodiment.

Turning to FIG. 4, another example of a beamforming system 100 is illustrated according to a non-limiting embodiment. The beamforming system 100 operates in a similar manner as described in detail above. According to an embodiment, the beam weight units 124a-124d apply different weights such as, for example, different phase-shifts, with respect to one another. For example, beam weight unit 124a applies a first weight to a respective input channel, beam weight unit 124b applies a second weight to a respective input channel, beam weight unit 124c applies a third weight to a respective input channel, and beam weight unit 124d applies a fourth weight to a respective input channel.

One or more common channels 116 of each channelizer 110a-110d are tapped upstream from the beam weight units 124a-124d. According to an exemplary embodiment, a first channel (e.g., channel 1) common among each channelizer 110a-110d is tapped at a first point upstream from the beam weight units 124a-124d to generate a first channel set. The first channel set is delivered to a first beam weight unit such as, for example, unit 124a, which applies a first beam weight to the first channel set. The weighted outputs 125a from the first beam weight unit 124a are delivered to a first summer such as, for example, summer 122a, which combines the weighted outputs 125a to form a first common channel beam 127a that is steered in a first direction.

The first common channel is also tapped at a second point upstream from the beam weight units 124a-124d to generate a second channel set. According to an embodiment, the second channel set is generated simultaneously with the first channel set. The second channel set is output to a second beam weight unit such as, for example, unit 124d, which applies a second beam weight different from the first beam weight. The second set of weighted outputs 125d from the second beam weight unit 124d is delivered to a second summer such as, for example, summer 122d, which combines the weighted outputs 125d to form a second common channel beam 127d that is steered in a second direction different from the first direction of the first common channel beam 127a. Accordingly, a set of common channels from each channelizer 110a-110d is tapped and applied with different beam weights to simultaneously produce multiple beams (e.g., 127a, 127d) steered in different directions with respect to one another.

Figure 5:
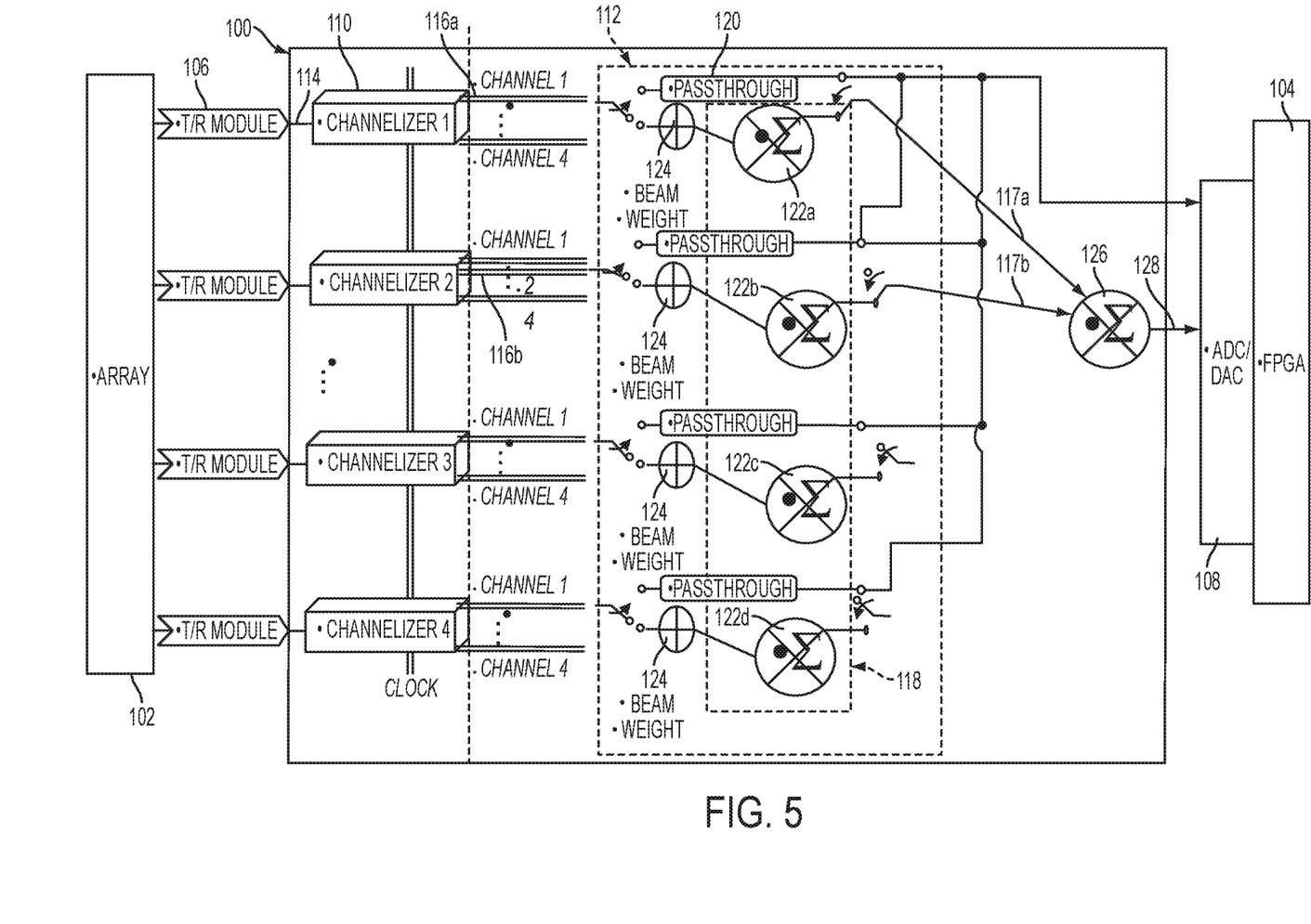
FIG. 5 is a schematic diagram of a beamforming system according to yet another exemplary embodiment.

Referring now to FIG. 5, another example of a beamforming system 100 is illustrated according to a non-limiting embodiment. The beamforming system 100 operates in a similar manner as described in detail above. The beamforming system 100 shown in FIG. 5, however, includes a beam combiner 126 interposed between the output of the channel combining circuit 118 and the signal converter 108. Each summer 122a-122d of the channel combining circuit 118 can selectively output a respective channel beam 117a-117d. For example, a first summer 122a outputs a first channel beam 117a (i.e., a beam formed by combing one or more first channels 116a (e.g., channel 1) having a frequency ranging, for example, from approximately 0 GHz to approximately 3 GHz. A second summer 122b outputs a second channel beam 117b (i.e., a beam formed by combing one or more second channels 116b (e.g., channel 2) having a frequency ranging from approximately 3 GHz to approximately 6 GHz. The beam combiner 126 combines two or more individual channel beams output from a respective summer 122a-122d (e.g., the first channel beam 117a and the second channel beam 117b) to form a single combined beam 128 that is multiple channels wide. Although the combined beam 128 is generated in response to combining beam 117a from summer 122a and beam 117b output from summer 122b, it is appreciated that the beamforming system 100 is configured to combine any grouping of beams output from the summers 122a-122d to generate the single combined beam 128.

Figure 6:
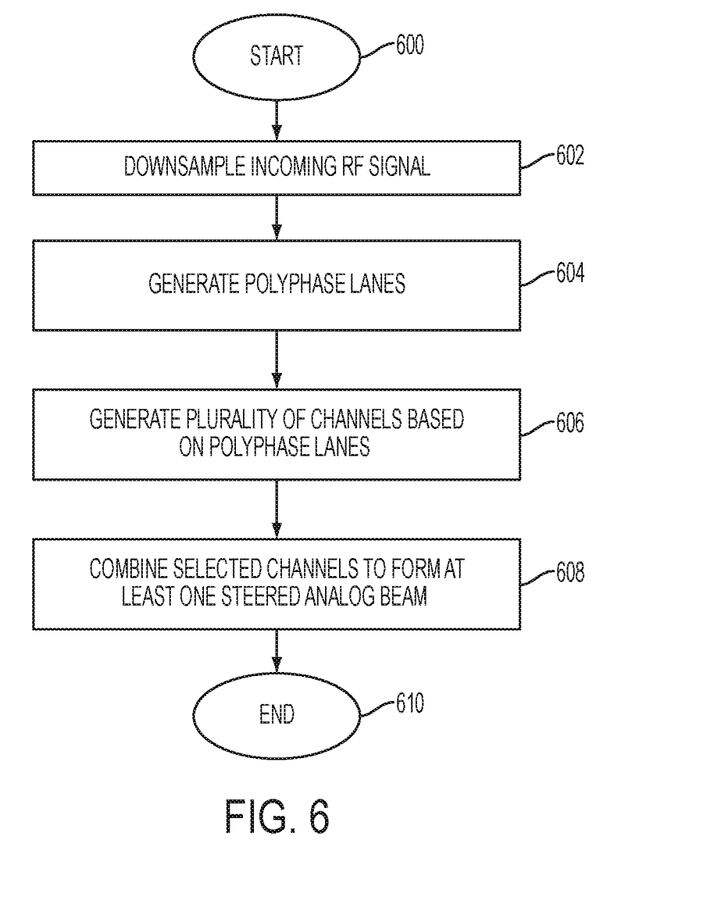
FIG. 6 is a flow diagram illustrating a method of beamforming an RF signal according to an exemplary embodiment.

Turning now FIG. 6, a flow diagram illustrates a method of beamforming a radio frequency signal according to a non-limiting embodiment. The method begins at operation 600, and at operation 602, an incoming RF signal is downsampled. The downsampled signals are utilized to generate a plurality of polyphase lanes at operation 604. At operation 606, a plurality of channel sets are generated based on the polyphase lanes. Each channel set includes a plurality of channels. At operation 608, selected channels from one or more of the channel sets are combined to form at least one steered analog beam, and the method ends at operation 610. It is appreciated that any embodiment of the present invention including, but not limited to, the beamforming systems described with referenced to FIGS. 1, 4 and 5, can implement the method of FIG. 6.

Figure 7:
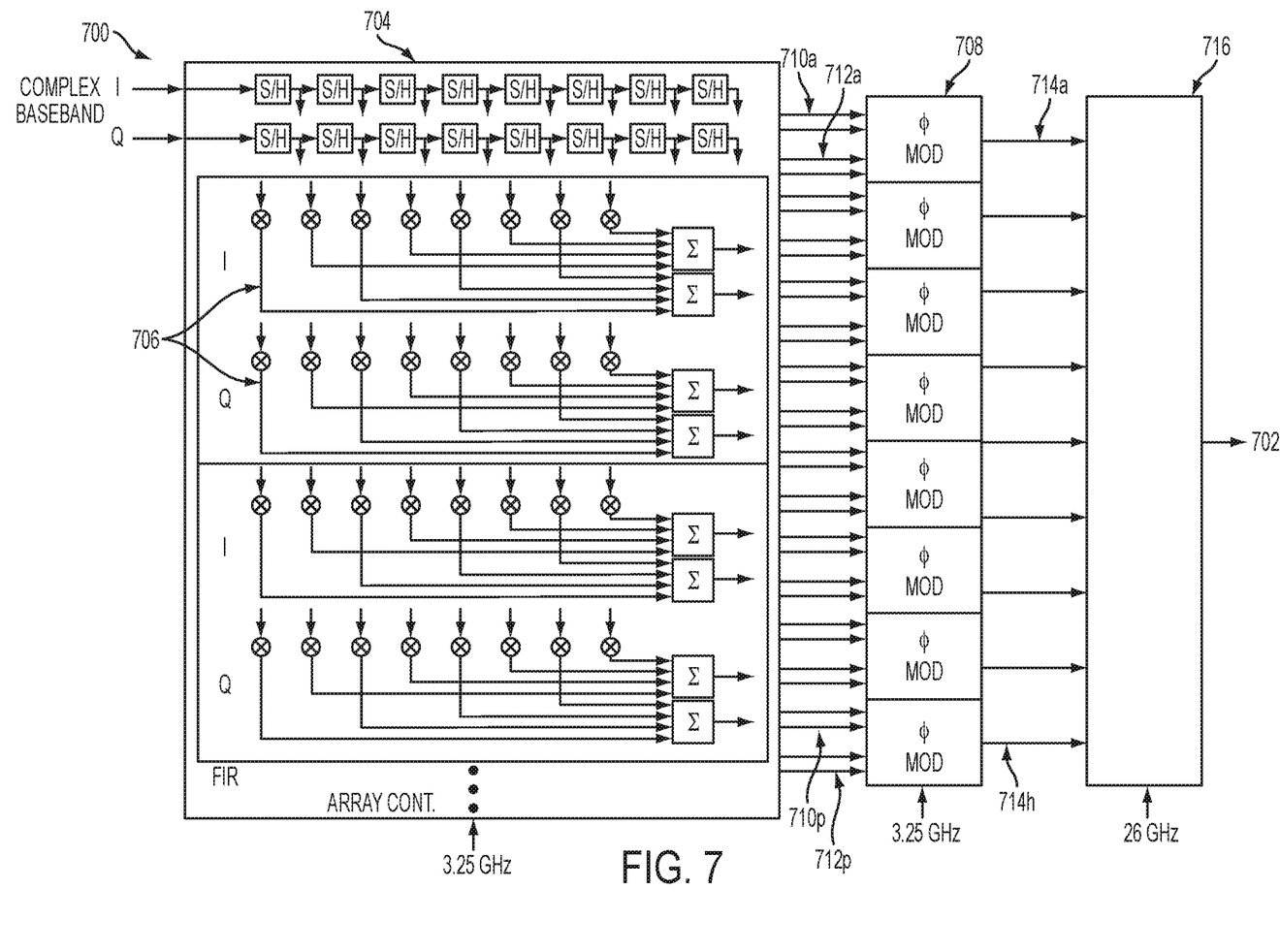
FIG. 7 is a schematic diagram of an inverse channelizer to transmit an input signal from a number of baseband I/Q channel inputs according to an exemplary embodiment.

Referring now to FIG. 7, an inverse channelizer 700 is illustrated according to a non-limiting embodiment. The inverse channelizer 700 is configured to process one or more input signals, such as a complex RF input signal (I, Q) for example, from a number of baseband channel inputs to generate a steered output RF signal 702.

The inverse channelizer 700 includes a filter unit 704 and 706 and one or more Fourier transform units 708. The filter unit 704 such as, for example, a polyphase decimating finite impulse response (FIR) filter array, is configured to convert a plurality of polyphase signals into one or more up-sampled baseband channels (e.g., I/Q channels). The baseband channels are routed to a plurality of FIR filter branches 706 which are in signal communication with the Fourier transfer units 708. The branches 706 can be dynamically tapped to dynamically reconfigure the filter unit 704. The Fourier transform units 708 take in one or more baseband channels such as, for example, I/Q odd channels 710a and I/Q even channels 712a, and generate a number of real signal outputs 714. For example, two I input signals 710a and two Q signals 712a are combined to produce a real output 714a, such that from sixteen I/Q channels 710a-710p/712a-712p, eight real channels 714a-714h are formed.

The outputs 714a-714h are delivered to an electronic commutator unit 716 which samples one or more of the real output signals 714a-714h. For example, a first channel 714a is output on a first clock cycle, a second sample is output on a second clock cycle, etc. According to an embodiment, the commutator unit 706 receives eight real channels 714a-714h from the Fourier transfer units 706. The real channels 714a-714h are up-sampled and are clocked at 3.25 GHz rate, for example. The commutator unit 706 combines the real channels 714a-714h to form a single output signal 702 that is clocked at, for example, 26 GHz. According to the non-limiting embodiment illustrated in FIG. 7, the FIR filter unit 704 and the Fourier transform units 708 are all clocked at 3.25 GHz, for example, and the commutator unit 716 is clocked at, for example, 26 GHz.

The inverse channelizer 700 of FIG. 7 and channelizers 100 of FIGS. 1, 4 and 5 have similar operations. The inverse channelizer 700, however, includes the electronic commutator unit 716 disposed as the last stage. Thus, the inverse channelizer 700 converts eight real channel inputs 714a-714h into a single RF output 702 whereas the channelizer 100 includes a commutator disposed in the first stage which receives a single real input signal and produces eight channels, for example. It is appreciated that any number of input channels can be used. Accordingly, if the inverse channelizer allows four sets of complex input channels and data is only provided through one of the channels, the other remaining channels can be "grounded" and left unused. A number of digital to analog converters can be included to provide the inputs to these complex baseband channels into the inverse channelizer. According to an embodiment, a channelizer 100 can be in signal communication with the inverse channelizer 700. In this manner, common nodes can be formed such that the FIR filter unit 704 of the inverse channelizer can re-use circuit blocks from the channelizer 100.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A beamforming system, comprising:
   at least one channelizer configured to receive a respective input radio frequency signal and to generate a plurality of respective channels in response to downsampling the respective input radio frequency signal;
   an electronic channel switching module in signal communication with the plurality of channelizers, the channel switching module including a channel combining circuit configured to selectively combine a common channel generated by each channelizer to form at least one steered analog beam, the channel switching module including at least one pass-through circuit that is selectively connected to a channel among the plurality of channels generated by at least one respective channelizer to generate a pass-through channel that bypasses the channel combining circuit;
   an electronic inverse channelizer unit in signal communication with the at least one channelizer, the inverse channelizer unit including a polyphase decimating finite impulse response (FIR) filter array configured to output a first plurality of up-sampled baseband channels based on at least one complex input signal;
   at least one electronic Fourier transform unit configured to convert the first plurality of up-sampled baseband channels into a second plurality of real output signals; and
   an electronic commutator unit configured to generate a single radio frequency (RF) output signal.

2. The beamforming system of claim 1, wherein electronic commutator unit generates the single RF output signal in response to combining the second plurality of real output signals.

3. The beamforming system of claim 2, wherein the at least one Fourier transform unit includes a plurality of Fourier transform units, and wherein the polyphase decimating FIR filter array includes a plurality of FIR filter branches that are in signal communication with the plurality of Fourier transfer units.

4. The beamforming system of claim 3, wherein the plurality of FIR filter branches are dynamically tapped to dynamically reconfigure the plurality of Fourier transform units.

5. The beamforming system of claim 4, wherein the polyphase decimating FIR filter array and the plurality of Fourier transform units are each driven according to a first clock frequency, and the commutator unit is driven at a second clock frequency different from the first clock frequency.

6. The beamforming system of claim 5, wherein the first clock frequency is less than the second clock frequency.

7. The beamforming system of claim 6, wherein the commutator unit samples each real output signal output from a respective Fourier transfer unit according to a respective clock cycle.

* * * * *